(12) United States Patent
Boeve et al.

(10) Patent No.: US 7,958,644 B2
(45) Date of Patent: Jun. 14, 2011

(54) ORIENTATION SENSING IN A MULTI PART DEVICE

(75) Inventors: Hans M. B. Boeve, Hechtel-Eksel (BE); Teunis J. Ikkink, Geldrop (NL)

(73) Assignee: NXP B.V., Eindhoven (NL)

( * ) Notice: Subject to any disclaimer, the term of this patent is extended or adjusted under 35 U.S.C. 154(b) by 408 days.

(21) Appl. No.: 12/306,243

(22) PCT Filed: Jun. 15, 2007

(86) PCT No.: PCT/IB2007/052294
§ 371 (c)(1),
(2), (4) Date: Dec. 22, 2008

(87) PCT Pub. No.: WO2008/007261
PCT Pub. Date: Jan. 17, 2008

(65) Prior Publication Data
US 2009/0239586 A1    Sep. 24, 2009

(30) Foreign Application Priority Data

Jun. 23, 2006 (EP) ..................................... 06115944

(51) Int. Cl.
*G01C 17/38* (2006.01)
(52) U.S. Cl. ...................................................... 33/355 R
(58) Field of Classification Search ................. 33/355 R, 33/356
See application file for complete search history.

(56) References Cited

U.S. PATENT DOCUMENTS

| | | | | |
|---|---|---|---|---|
| 7,117,564 B2 * | 10/2006 | Jeong | ................................ | 16/334 |
| 7,142,415 B2 * | 11/2006 | Hillman et al. | ........... | 361/679.06 |
| 7,209,344 B2 * | 4/2007 | Hillman et al. | ........... | 361/679.21 |
| 7,308,733 B2 * | 12/2007 | An et al. | ........................ | 16/367 |
| 7,369,175 B2 * | 5/2008 | Kim | ............................... | 348/373 |
| 7,773,371 B2 * | 8/2010 | Hillman et al. | ........... | 361/679.06 |
| 2004/0172838 A1 | 9/2004 | Satoh et al. | | |
| 2004/0192398 A1 * | 9/2004 | Zhu | ................................ | 455/566 |
| 2004/0218352 A1 * | 11/2004 | Hillman et al. | ............... | 361/683 |
| 2004/0227045 A1 * | 11/2004 | An et al. | ..................... | 248/278.1 |
| 2005/0124392 A1 * | 6/2005 | Jeong | ......................... | 455/575.1 |
| 2005/0283988 A1 | 12/2005 | Sato | | |
| 2007/0044334 A1 * | 3/2007 | Leizerovich | ..................... | 33/334 |
| 2009/0239586 A1 * | 9/2009 | Boeve et al. | .................. | 455/566 |
| 2010/0102980 A1 * | 4/2010 | Troy et al. | .................. | 340/686.6 |

FOREIGN PATENT DOCUMENTS

| | | | |
|---|---|---|---|
| GB | 2387063 A | * | 10/2003 |
| WO | 2005121930 A | | 12/2005 |
| WO | 2006011731 A1 | | 11/2006 |
| WO | 2006117728 A1 | | 11/2006 |

* cited by examiner

*Primary Examiner* — Yaritza Guadalupe-McCall

(57) ABSTRACT

A device comprises a first part (1) which has user input means (10) and comprising a three-degrees-of-freedom orientation sensing system (11) for determining a three-degrees-of-freedom orientation (01) of the first part (1) with respect to a reference coordinate frame (XYZ) defined by the earths gravity field (Fg) and magnetic field (Fm). A second part (2) comprises a display (20) for displaying orientation information (OI) on a three-degrees-of-freedom orientation (02) of the second part (2), and sensing means (21) for sensing an one-degree-of-freedom or a two-degrees-of-freedom orientation of the second part (2). Further, are provided means (5) for calculating the three-degrees-of-freedom orientation (02) of the second part (2) from the three-degrees-of-freedom orientation (01) of the first part (1) and the one-degree-of-freedom or the two-degrees-of-freedom orientation of the second part (2), and means (6) for generating the orientation information (01) in response to the calculated three-degrees-of-freedom orientation (02) of the second part (2) to obtain correct display of the orientation information (01) independent on an orientation of the second part (2) with respect to the first part (1).

11 Claims, 2 Drawing Sheets

Figure 3:
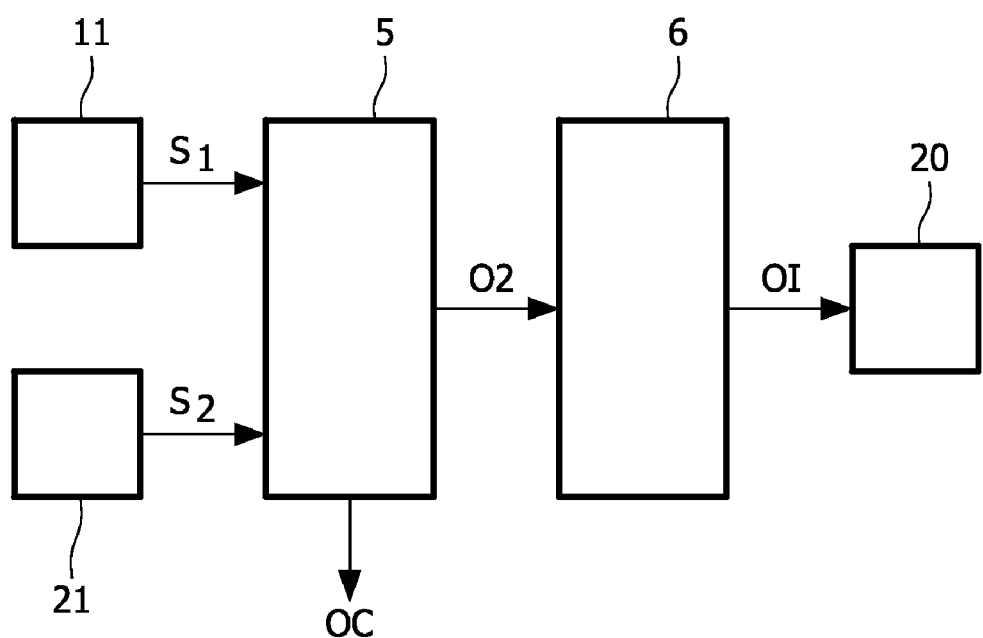

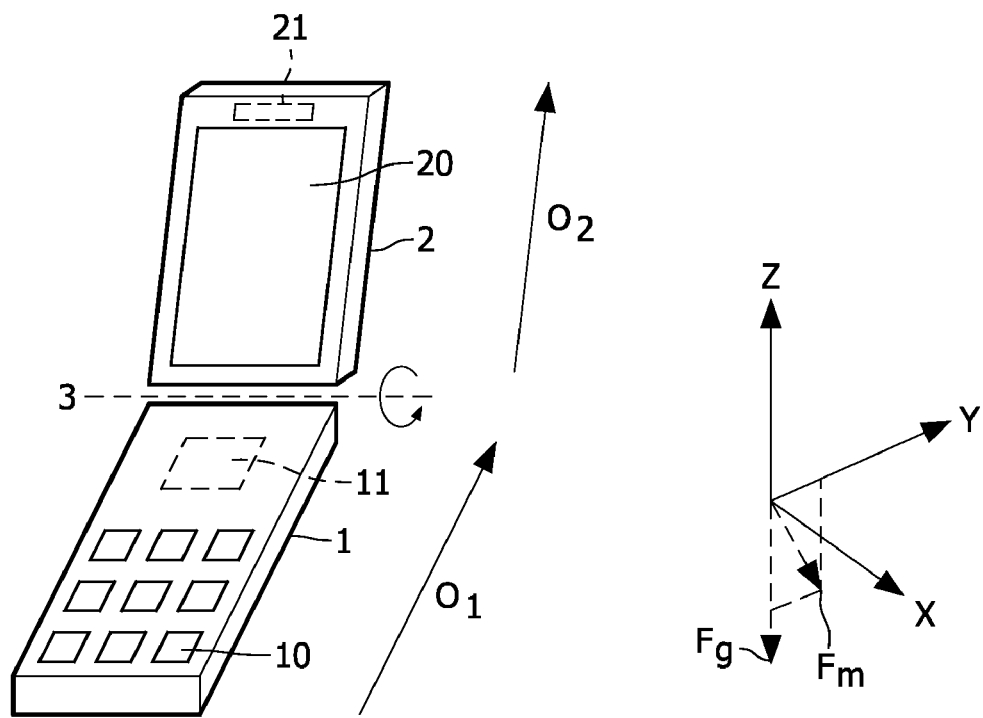
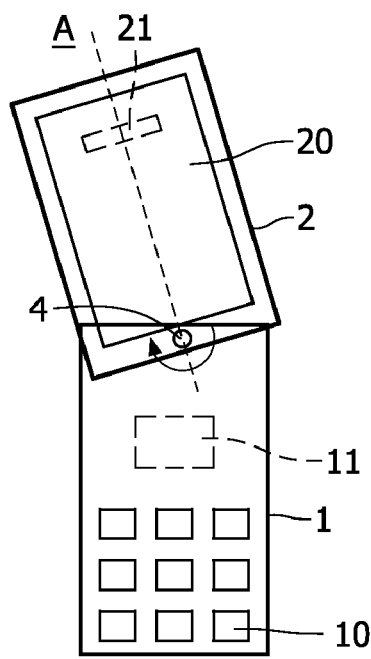
FIG. 2

ORIENTATION SENSING IN A MULTI PART DEVICE

The invention relates to a device which comprises a first part having user input means and a three-degrees-of-freedom orientation system and a second part having a display for displaying the orientation of the second part.

US2004/0172838 disclosed a method for measuring a directional of a body in a three-dimensional space defined by an X-axis (magnetic north), a Y-axis, and a Z-axis. The direction of the body is detected with a three-dimensional orientation sensor which comprises a three-dimensional magnetic sensor and a three-dimensional tilt sensor.

Such a three-dimensional orientation sensor is relatively bulky and often cannot be used in a relatively thin display part of a mobile phone which further has a separate part with buttons to receive the user input. When the three-dimensional orientation sensor is located in the part with buttons, the display of the orientation of the display part on the display part may be incorrect.

It is an object of the invention to provide a correct display of the orientation of a part of a device which comprises a one-dimensional or two-dimensional sensor only.

A first aspect of the invention provides a device as claimed in claim 1. Advantageous embodiments are defined in the dependent claims.

A device in accordance with the first aspect of the invention comprises a first part and a second part which can have another orientation than the first part. The first part has user input means and comprises a three-degrees-of-freedom orientation sensing system for determining a three-degrees-of-freedom orientation of the first part with respect to a reference coordinate frame defined by the earth's gravity field and magnetic field. In the now following the term "n-degrees-of freedom" may also be referred to as "n-dimensional". Thus three-degrees-of freedom means that any orientation in the three-dimensional space can be detected. The second part comprises a display for displaying orientation information on a three-degrees-of-freedom orientation of the second part, and a sensor for sensing an one-degree-of-freedom or a two-degrees-of-freedom orientation of the second part.

The three-degrees-of-freedom orientation of the second part is calculated from the three-degrees-of-freedom orientation of the first part and the one-degree-of-freedom or the two-degrees-of-freedom orientation of the second part. The orientation information is generated in response to the calculated three-degrees-of-freedom orientation of the second part to obtain correct display of the orientation information independent on an orientation of the second part with respect to the first part.

Thus, the three-degrees-of-freedom orientation of the second part is determined by using the offset orientation of the second part with respect to the three-degrees-of-freedom orientation of the first part. This offset orientation is determined by the sensor for the one-degree-of-freedom or a two-degrees-of-freedom orientation of the second part. The position of this one-degree-of-freedom or the two-degrees-of-freedom orientation sensor depends on how the second part moves with respect to the first part. Usually, the first part and the second part rotate with respect to each other around a rotation axis. The complexity of the sensor is determined by the number of degrees of freedom of the movement of the second part with respect to first part.

The present invention may be advantageously used in a two part mobile phone which has the first part with user buttons and a second part with the display.

In an embodiment as claimed in claim 2, the sensor in the second part comprises an accelerometer or magnetometer sensor. Such a sensor is much smaller than a three-dimensional orientation sensor.

In an embodiment as claimed in claim 3, the first part and the second part are rotatably connected for rotating with respect to each other in a clamshell movement and/or a swivel movement. For example, for a clamp-shell movement or a swivel movement in one-dimension, a one-degree-of-freedom sensor is sufficient. For a swivel movement in two-dimensions, a two-degree-of-freedom sensor is required.

In an embodiment as claimed in claim 4, the orientation information comprises an indication of a direction, or text. For a user who is looking towards the screen of the display, the display of, for example, a compass or text is always correctly oriented independent of the orientation of the second part because the three-dimensional position of the second part and thus the display thereof is known. For example, in a clam-shell type movement of the second part towards the first part, without correction, an arrow direction to the north would flip to the south at the instant the second part moves through the direction perpendicular to the earth surface.

In an embodiment as claimed in claim 5, the open-closed detector detects whether the device is in an open state or in a closed state by using the same three-degrees-of-freedom orientation of the first part and the one-degree-of-freedom or the two-degrees-of-freedom orientation of the second part. Consequently, without any further provisions, it is possible to detect whether the device is closed or open. All conventional actions related to being open or closed can thus be controlled without the need for a further sensor.

In an embodiment as claimed in claim 6, the three-degrees-of-freedom orientation sensing system comprises an electronic compass. Such an electronic compass may comprise a three-dimensional accelerometer and a three-dimensional magnetometer, or in another embodiment a three-dimensional accelerometer and a two-dimensional magnetometer. Alternatively, the electronic compass may comprise a two-dimensional accelerometer and a three-dimensional magnetometer, or both a two-dimensional accelerometer and magnetometer.

These and other aspects of the invention are apparent from and will be elucidated with reference to the embodiments described hereinafter.

In the drawings:

FIG. 1 schematically shows an embodiment of a two-part device in accordance with the present invention, FIG. 2 schematically shows another embodiment of a two-part device in accordance with the present invention, and FIG. 3 shows a block diagram of a circuit for generating the orientation information.

It should be noted that items which have the same reference numbers in different Figures, have the same structural features and the same functions, or are the same signals. Where the function and/or structure of such an item has been explained, there is no necessity for repeated explanation thereof in the detailed description.

FIG. 1 shows a two-part device with a first part 1 which comprises user input means 10 and a three-degrees-of-freedom orientation sensing system 11, and a second part 2 which comprises the display 20 and the one-degree or two-degrees-of-freedom orientation sensor 21. The first part 1 and the second part 2 are rotatably connected to rotate with respect to each other around the rotation axis 3 in a clam-shell like movement. Such a two-part device may be a mobile phone, or any other hand-held device with a user input part and a display part which are movable with respect to each other.

By way of example, the user input means 10 are shown to be buttons. Instead of the buttons 10, or in addition to the buttons 10, other user input means may be present, such as for example a touch pad, a track ball, a multi-direction switch, a joystick or the like. With a multi-direction switch is meant a switch which reacts on different movement directions, for example: up/down and/or left/right, and/or push. The three-degrees-of-freedom orientation sensing system 11 provides information on the orientation O1 of the first part 1 with respect to the earth. This orientation O1 is referred to as the three-degrees-of-freedom orientation because it is possible to determine any orientation of the first part 1 in a three-dimensional space. Such a three-degrees-of-freedom orientation system 11 uses the gravity field Fg of the earth and the magnetic field Fm of the earth to determine an arbitrary orientation O1 of the first part 1 in space. Preferably, the three-degrees-of-freedom orientation system 11 comprises a three-dimensional accelerometer and a two dimensional magnetometer as described in non-prepublished applications PCT/IB2006/051314 (PH000613) and PCT/IB2006/051317 (PH000319). The fact that the magnetometer need not be a three-dimensional sensor but can be a two-dimensional sensor is a great advantage, owing to the fact that two-dimensional magnetometer sensors can be produced easier and at lower costs and can be more durable and of a smaller size.

The second part 2 can only be moved with respect to the first part in one dimension or direction. Therefore, it suffices to implement a one-degree-of-freedom orientation sensor 21 which detects the movement in this one dimension. The orientation O2 of the second part 2, which again is a three-degrees-of-freedom orientation, is determined by using the output of the three-degrees-of-freedom orientation system 11 and the one-degree-of-freedom orientation sensor 21. In fact, the sensor 21 provides the offset orientation of the second part 2 with respect to the first part 1. For example, if the orientation sensor 21 is a one-dimensional accelerometer sensor, a component of the gravity vector Fg in the plane of the second part 2 is determined. The sensitivity axis of the one-dimensional accelerometer sensor is arranged at a non-zero angle (i.e. not parallel) with the rotation axis which connects part 1 and part 2, as indicated in FIG. 1. Preferably, the sensitivity axis of the one-dimensional accelerometer sensor is perpendicular to the rotation axis. If the orientation sensor 21 is a one-dimensional magnetometer sensor, a component of the earth magnetic field Fm in the plane of the second part 2 is determined. Again the sensitivity axis of the one-dimensional magnetometer sensor is arranged at a non-zero angle with the rotation axis which connects part 1 and part 2, as indicated in FIG. 1. Preferably, the sensitivity axis of the one-dimensional magnetometer sensor is perpendicular to the rotation axis.

FIG. 1 further shows an example of a reference coordinate frame XYZ which is defined by the earths gravity field Fg and magnetic field Fm. In the example shown, the Z axis has a direction opposite to the gravity field Fg and the Y axis points to the magnetic north of the earth. Consequently, the earth's magnetic field vector Fm lies in the ZY plane.

FIG. 2 schematically shows another embodiment of a two-part device in accordance with the present invention. The device shown in FIG. 2 is largely identical to the device shown in FIG. 1. However, instead of the clam-shell movement of the first part 1 and the second part 2 along the rotation axis, a swivel movement occurs around the swivel axis or swivel point 4. If the swivel movement is a one-dimensional movement around an axis 4 perpendicular to the parts 1 and 2, it suffices to use a one-degree-of-freedom orientation sensor 21. If the swivel movement is a two-dimensional movement, for example around a ball joint, a two-degree-of-freedom orientation sensor 21 has to be used to be able to determined the position O2 of the second part 2. Such a two-dimensional swivel movement may be obtained by a construction 4 which movably connects the first part 1 and the second part such that the second part 2 can both be moved in a clam shell like manner and can rotate around its axis A.

FIG. 3 shows a block diagram of a circuit for generating the orientation information. The three-degrees-of-freedom orientation sensing system 11 supplies information S1 defining the position O1 of the first part 1. The one-degree-of-freedom or the two-degrees-of-freedom orientation sensor 21 supplies information S2. The circuit 5 calculates the orientation O2 of the second part 2 from the information S1 and the information S2. The circuit 6 generates orientation information OI to be displayed on the display 20. The display of the orientation information OI on the display is dependent on the orientation O2 of the second part 2 and thus the orientation of the display 20. Usually, the display of the information OI on the display 20 has a fixed orientation. For example, text is always displayed in the top-down direction, and an arrow indicating north points from bottom to top of the display. It has to be noted that the definition of top and bottom of the display 20 in fact is based on the assumption that the display 20 is held upright with respect to the earth's surface and thus the bottom of the display 20 is nearer to the earth's surface than the top, and that the display is held in a position with respect to the eyes of the viewer that it is readable. Usually the display is held substantially perpendicular to a line extending from the eyes of the viewer and the display. Consequently, if an arrow which indicates the north direction points from bottom to top it is really pointing towards north. An example is shown in FIG. 1, if the viewer holds the device by holding the first part 1 with its hand almost in parallel with the earth's surface and the display 20 is in the position shown, the arrow indicating north really points to the north if the part 1 is pointing to north. However, if now the part 2 and thus the display 20 is moved towards the part 1 in the clam shell like manner as shown in FIG. 1, once the angle between the display 20 and the earth's surface becomes smaller than 90 degrees, the arrow is pointing to the back of the viewer and thus to south.

In the present invention, the orientation O2 of the second part 2 is determined by using the three-dimensional sensor 11 in the first part 1 and a relatively simple one or two-dimensional sensor 21. The one or two-dimensional sensor 21 is only required to be able to determine the relative orientation or position of the second part 2 with respect to the first part 1. Because, usually the second part 2 is movable connected to the first part 1 in a known way, it is known which movement(s) the second part 2 can make with respect to the first part 1. Consequently, it is known which type of sensor 21 is required and how it should be positioned.

Anyhow, because the orientation O2 of the second part 2 and thus the display 20 with respect to the earth is known, it is possible to correct the display information OI on the display 20 such that the viewer sees the correct information. For example, when is detected than the above discussed angle becomes smaller than 90 degrees the display of the arrow is changed such that the arrow points from top to bottom of the display 20 and thus again points in front of the viewer to the actual north position and not anymore to the back of the viewer.

Alternatively, if from the orientation O2 it is detected that the part 2 and thus the display 20 is held top-down, the information OI may be displayed bottom to top instead to top to bottom such that displayed text stays readable.

An example of a two part device is a clam-shell phone as shown in FIG. 1. The orientation O1 of part 1 is expressed as a 3×3 rotation matrix $^rP1$, where the superscript $^r$ indicates that the reference geomagnetic coordinate system is used to express the orientation. It has to be noted that a matrix or vector is indicated with a bold character font, while a scalar is indicated by a normal character font. The base vectors of the geomagnetic coordinate system are $r_x$=east, $r_y$=north, $r_z$=up. The columns of the rotation matrix $^rP1$ denote the axes (unit-length orthogonal base vectors $^rP1_x$, $^rP1_y$, $^rP1_z$) of the body coordinate frame expressed in the base vectors of the geomagnetic coordinate system.

It is now assumed that the parts 1 and 2 are connected by a joint whose hinge axis is the rotation axis 3. The rotation axis 3 is further indicated by L and is assumed to be aligned to the body X-axis of part 1. Hence the rotation axis can be expressed as $L=P1_x$.

The orientation O2 of the part 2 is expressed as a 3×3 rotation matrix $^rP2$ expressed in the reference coordinate system. The orientation O2 of part 2 can also be expressed in terms of the body coordinate frame of the part 1, i.e. a 3×3 rotation matrix $^{P1}P2$.

The coordinate frame of part 2 is selected such that it is aligned to that of part 1 when the hinge is opened over 180 degrees. The body X-axis of part 2 is assumed to be aligned to the rotation axis L, i.e. $L=P2_x$. Thus the matrix $^{P1}P2$ has just one degree of freedom, and we can alternatively express this degree of freedom as a rotation of part 2 with respect to part 1 through a right-handed rotation angle α about the rotation axis L which is the X-axis of either body:

$$^{P1}P2 = \begin{bmatrix} 1 & 0 & 0 \\ 0 & \cos\alpha & -\sin\alpha \\ 0 & \sin\alpha & \cos\alpha \end{bmatrix}$$

Further is true:

$$^rP2 = {^rP1} \cdot {^{P1}P2}$$

The superscript r indicates that the reference geomagnetic coordinate system is used to express the orientation. The superscript P1 indicates the body-coordinate system of part 1.

These two equations show how the orientation O2 of part 2 can be determined from the orientation O1 of part 1 and the one-degree-of-freedom rotation matrix $^{P1}P2$. Orientation-related quantities, such as tilt-compensated heading, can now be determined from $^rP2$ in the usual way. It is to be noticed that the effective internal angle of a clam-shell phone, with keypad and display face-to-face in closed position, corresponds to the angle β, that is related to the angle α as β=π−α. A closed phone corresponds to β=0, while an increase of opening angle will correspond to an increased β.

It is further assumed that the additional sensor axis in part 2 denoted by the unit vector S, is oriented along the body Y-axis of part 2 and thus extends perpendicular to the rotation axis L. Hence $$^{P1}S = {^{P1}P2_Y}$$

$$= \begin{bmatrix} 0 \\ \cos\alpha \\ \sin\alpha \end{bmatrix}$$

$$= \begin{bmatrix} 0 \\ -\cos\beta \\ \sin\beta \end{bmatrix}$$

$$^rS = {^rP1} \cdot {^{P1}S}$$

$$= [{^rP1_x} \quad {^rP1_y} \quad {^rP1_z}] \cdot \begin{bmatrix} 0 \\ -\cos\beta \\ \sin\beta \end{bmatrix}$$

$$= -\cos\beta \cdot {^rP1_y} + \sin\beta \cdot {^rP1_z}$$

A normalized measurement made by the additional sensor axis in part 2 can be written as the dot-product of the unit-length sensor axis S with the relevant vector field, i.e. either the earth's gravitational field g or the magnetic field B. or $$^rg = \begin{bmatrix} 0 \\ 0 \\ -1 \end{bmatrix}$$

$$^rB = \begin{bmatrix} 0 \\ \cos\gamma \\ -\sin\gamma \end{bmatrix}$$

Wherein γ refers to the inclination angle of the magnetic field, i.e. the angle with the horizontal plane. The sensor measurement of part 2 can then be written for an ideal accelerometer as the scalar $\langle A \rangle = {^rS} \cdot {^rg}$ and for an ideal magnetometer as the scalar $\langle M \rangle = {^rS} \cdot {^rB}$.

Using the previously found expression for $^rS$, we get an accelerometer signal:

$$\langle A \rangle = (-\cos\beta \cdot {^rP1_y} + \sin\beta \cdot {^rP1_z}) \cdot \begin{bmatrix} 0 \\ 0 \\ -1 \end{bmatrix}$$

$$= \cos\beta \cdot {^rP1_{y,z}} - \sin\beta \cdot {^rP1_{z,z}}$$

wherein $^rP1_{y,z}$ denotes the z-component of the Y-axis of part 1, expressed in the reference coordinate system (i.e. the vertical component), and $^rP1_{z,z}$ denotes the z-component of the Z-axis of part 1, expressed in the reference coordinate system. In the case of a magnetometer we similarly get a signal $$\langle M \rangle = (-\cos\beta \cdot {^rP1_y} + \sin\beta \cdot {^rP1_z}) \cdot \begin{bmatrix} 0 \\ \cos\gamma \\ -\sin\gamma \end{bmatrix}$$

$$= -\cos\gamma \begin{pmatrix} \cos\beta \cdot {^rP1_{y,y}} - \\ \sin\beta \cdot {^rP1_{z,y}} \end{pmatrix} + \sin\gamma \begin{pmatrix} \cos\beta \cdot {^rP1_{y,z}} - \\ \sin\beta \cdot {^rP1_{z,z}} \end{pmatrix}$$

which is a sum of the sensor-projected north-bound field component and the sensor-projected up-bound field component. An alternative factorization is the following $$\langle M \rangle = \cos\beta(\sin\gamma \cdot {^rP1_{y,z}} - \cos\gamma \cdot {^rP1_{y,y}}) - \sin\beta(\sin\gamma \cdot {^rP1_{z,z}} + \cos\gamma \cdot {^rP1_{z,y}})$$

Similar expressions for a one-dimensional accelerometer or magnetometer sensor can be deduced for the example of FIG. 2, where a one-dimensional swivel movement occurs around the swivel axis or swivel point 4 connecting part 1 and part 2 of the mobile phone.

In the case of a phone model where two-degrees-of-freedom are available to move part 2 with respect to part 1, one two-dimensional sensor, either an accelerometer or magnetometer, or two one-dimensional sensors, i.e. accelerometer and magnetometer, can be implemented. The sensitive axis of each dimension of such two-dimensional sensor is preferably perpendicular to one of the degrees-of-freedom connecting part 2 to part 1 within the mobile phone. Depending on the mobile phone configuration, expressions for the different sensors can now be found in a similar way, as function of two angles $\beta$, and $\xi$ representing the degrees-of-freedom, e.g. $\langle S_i \rangle = f_i(\beta, \xi)$ for two different sensor axes.

In both one-dimensional examples, as discussed before, a general form of the expressions for the accelerometer or magnetometer signal $\langle S \rangle$ is $$\langle S \rangle = f(\beta) = u \cdot \cos \beta + v \cdot \sin \beta$$

wherein the scalars u and v can be determined from the orientation O1 of part 1 and the inclination angle of the magnetic field in the case of a magnetometer. This equation can be solved for the hinge angle $\beta$ in different ways, either analytically or iteratively. However, for a single orientation O1 of part 1 (i.e. fixed coefficients u, v, this equation in general has two solutions. The solution can be found using (a combination of) different strategies, including: taking into account the boundary conditions, i.e. minimum and maximum values for the rotation angle $\beta$. For clam-shell phones, it is assumed that $0 \leq \beta \leq 180°$.

1. taking into account at least two different orientations O1 of part 1 (i.e. at least two sets u, v). In the assumption that the rotation angle $\beta$ has not changed, a unique solution can be found for the different sets of sensor values.
2. taking into account a priori information for weighing different solutions, e.g. the use of the previous solution as best guess for the next solution. This is preferred in the assumption that the angle $\beta$ does not change often during mobile phone use.
3. Elaborating further on the last option, one may implement this feature in the following way. Rather than calculating the rotation angle $\beta$ for every point, one simply verifies the equation $$\langle S \rangle = u \cdot \cos \beta + v \cdot \sin \beta$$

for its validity in the assumption that the angle $\beta$ has not changed. Such implementation will be more efficient in terms of calculation time and power. Only when the equation is no longer valid, one will go back to the previously listed options for defining a new value for the rotation angle $\beta$.

The determination of the orientation O2 of the part 2 further has the advantage that it is known whether the device is closed (the orientations O1 and O2 are such that the internal angle $\beta$ is zero) or not (the orientations O1 and O2 are such that the internal angle $\beta$ differs from zero). It is not required to implement a switch or other means to determine whether the device is closed or not. The information on whether the device is closed or not can be used in the usual manner. For example, the device may be switched off when is detected that it is closed.

The determination of the orientation O2 of the part 2 further has the advantage that the internal angle(s) connecting the different parts is/are known. This information can be used in different ways. For example, the device may be switched on or off when a threshold value for the internal angle is crossed. Audible and visual effects may be included into the mobile phone, whereby the perceived effect relies on an internal angle $\beta$ as parameter.

In an embodiment the device is a mobile phone with a user input part 1 which usually has input keys 10 to input numbers and/or characters and a display part 2 which is movable with respect to the user input part 1. Because the display part 2 should be slim it is not possible to provide a three-dimensional orientation sensor 11 in the display part 2. Therefore, this relatively large sensor 11 is implemented in the user input part 1. Consequently, the three-dimensional orientation O1 of the user input part 1 is known. However, this may lead to incorrect display of position information OI on the display 20 of the display part 2 because its orientation O2 is not known. A further, relatively small sensor 21 is provided in the display part 2 such that together with the sensor 11 in the user input part 1 it is possible to determine the three-dimensional orientation O2 of the display part 2 and to correct the display of the position information OI such that it is correctly displayed on the display 20.

It should be noted that the above-mentioned embodiments illustrate rather than limit the invention, and that those skilled in the art will be able to design many alternative embodiments without departing from the scope of the appended claims.

For example, the circuit 5 for calculating and the circuit 6 for generating the orientation information may be a single circuit, for example a suitably programmed micro-processor or a dedicated circuit. These circuits may be present in either the first part 1 or the second part, or may be divided over the first part 1 and the second part 2. Any communication of information between the first part 1 and the second part 2, or the other way around, may be performed by known or dedicated interface which preferably is a digital interface such as for example SPI or I2C. Preferably, the sensors 11 and 21 provide their orientation information via such an interface.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A device comprising:
a first part having user input means and comprising a three-degrees-of-freedom orientation sensing system for determining a three-degrees-of-freedom orientation of the first part with respect to a reference coordinate frame (XYZ) defined by the earths gravity field (Fg) and magnetic field (Fm),
a second part comprising a display for displaying orientation information on a three-degrees-of-freedom orientation of the second part, and sensing means for sensing an one-degree-of-freedom or a two-degrees-of-freedom orientation of the second part, and
means for calculating the three-degrees-of-freedom orientation of the second part from the three-degrees-of-freedom orientation of the first part and the one-degree-of-freedom or the two-degrees-of-freedom orientation of the second part, and
means for generating the orientation information in response to the calculated three-degrees-of-freedom orientation of the second part to obtain correct display of the orientation information independent on an orientation of the second part with respect to the first part.

2. A device as claimed in claim 1, wherein the sensing means comprises an accelerometer or magnetometer sensor.

3. A device as claimed in claim 2, wherein the first part and the second part are rotatably connected for rotating with respect to each other in a clamshell movement and/or a swivel movement.

4. A device as claimed in claim 1, wherein the means for generating the orientation information is constructed for displaying the orientation information comprising an indication of a direction or of a text.

5. A device as claimed in claim 1, further comprising an open-closed detector for detecting whether the device is in an open state or in a closed state from the three-degrees-of-freedom orientation of the first part and the one-degree-of-freedom or the two-degrees-of-freedom orientation of the second part.

6. A device as claimed in claim 1, wherein the three-degrees-of-freedom orientation sensing system comprises an electronic compass.

7. A device as claimed in claim 1, wherein the three-degrees-of-freedom orientation sensing system comprises a three-dimensional accelerometer and a two-dimensional magnetometer.

8. A device as claimed in claim 1, wherein the sensing means for sensing an one-degree-of-freedom or a two-degrees-of-freedom orientation of the second part comprises:
an one-dimensional or two-dimensional sensor, producing sensor signals $\langle S_i \rangle = f_i(\beta, \xi)$.

9. A device as claimed in claim 8, wherein the sensing means for sensing an one-degree-of-freedom orientation of the second part comprises:
an one-dimensional accelerometer, producing an accelerometer signal $\langle A \rangle = u \cdot \cos \beta + v \cdot \sin \beta$, and
wherein the means for calculating the three-degrees-of-freedom orientation of the second part from the three-degrees-of-freedom orientation of the first part and the one-degree-of-freedom orientation of the second part are constructed for determining the scalars u and v from the orientation of the first part.

10. A device as claimed in claim 8, wherein the sensing means for sensing an one-degree-of-freedom orientation of the second part comprises:
an one-dimensional magnetometer, producing an magnetometer signal $\langle M \rangle = u \cdot \cos \beta + v \cdot \sin \beta$, and
wherein the means for calculating the three-degrees-of-freedom orientation of the second part from the three-degrees-of-freedom orientation of the first part and the one-degree-of-freedom orientation of the second part, are constructed for determining the scalars u and v from the orientation of the first part and the inclination angle of the second part with respect to the earth's magnetic field.

11. A device as claimed in claim 1, the device being a mobile phone.

\* \* \* \* \*